United States Patent [19]

Takei et al.

[11] 4,341,652
[45] Jul. 27, 1982

[54] ESTER COMPOUNDS, LIQUID CRYSTAL COMPOSITION INCLUDING SAME AND METHOD OF PRODUCTION

[75] Inventors: Katsumori Takei; Sadao Kanbe; Yoshio Shionozaki, all of Suwa, Japan

[73] Assignee: Kabushiki Kaisha Suwa Seikosha, Tokyo, Japan

[21] Appl. No.: 171,938

[22] Filed: Jul. 18, 1980

[30] Foreign Application Priority Data

Jul. 20, 1979 [JP] Japan .................................. 54/93082
Dec. 28, 1979 [JP] Japan ................................ 54/171819

[51] Int. Cl.$^3$ ......................... C09K 3/34; G02F 1/13; C07C 121/60; C07C 121/75
[52] U.S. Cl. .......................... 252/299.5; 252/299.62; 252/299.63; 252/299.64; 252/299.65; 252/299.66; 252/299.67; 260/465 D; 350/350 R
[58] Field of Search ........... 252/299.5, 299.62, 299.63, 252/299.64, 299.65, 299.66, 299.67; 260/465 D

[56] References Cited

U.S. PATENT DOCUMENTS

| | | | |
|---|---|---|---|
| 4,009,934 | 3/1977 | Goodwin et al. | 252/299.64 |
| 4,099,856 | 7/1978 | Weissflog et al. | 252/299.64 |
| 4,113,647 | 9/1978 | Coates et al. | 252/299.62 |
| 4,138,359 | 2/1979 | Mizukuchi | 252/299.65 |
| 4,173,545 | 11/1979 | Beguin et al. | 252/299.64 |
| 4,230,596 | 10/1980 | Beguin et al. | 252/299.64 |
| 4,235,736 | 11/1980 | Beguin et al. | 252/299.65 |
| 4,279,770 | 7/1981 | Inukai et al. | 252/299.63 |
| 4,279,771 | 7/1981 | Shionozaki et al. | 252/299.63 |
| 4,287,085 | 9/1981 | Takei et al. | 252/299.63 |
| 4,293,434 | 10/1981 | Deutscher et al. | 252/299.63 |

FOREIGN PATENT DOCUMENTS

| | | | |
|---|---|---|---|
| 2836086 | 3/1979 | Fed. Rep. of Germany | 252/299.64 |
| 2309509 | 11/1976 | France | 252/299.67 |
| 48-75484 | 10/1973 | Japan | 252/299.67 |
| 55-21429 | 2/1980 | Japan | 252/299.64 |
| 55-29545 | 3/1980 | Japan | 252/299.65 |
| 55-84385 | 6/1980 | Japan | 252/299.67 |

OTHER PUBLICATIONS

DuBois, J. C., et al., Mol. Cryst. Liq. Cryst., vol. 42, pp. 139–152 (1977).

*Primary Examiner*—Teddy S. Gron
*Attorney, Agent, or Firm*—Blum, Kaplan, Friedman, Silberman & Beran

[57] ABSTRACT

Ester compounds suitable for use in liquid crystal compositions are provided. The ester compounds are (2'-chloro-4'-n-alkylphenyl)-3-cyano-4-n-alkoxybenzoates represented by the general formula:

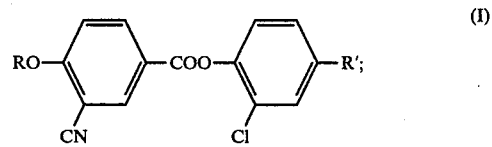

(I)

wherein R and R' are straight-chain alkyl groups having from one to eight carbon atoms. The ester compounds alone do not exhibit a liquid crystal phase, but have a relatively high value of dielectric anisotropy. Addition of minor amounts of at least one such ester compound to a liquid crystal composition lowers the value of the dielectric anisotropy of the composition in the high frequencies range. Such compositions are particularly well suited for the two-frequency matrix-addressing drive in a display of complex characters or graphic displays by reducing the driving voltage.

The ester compounds in accordance with the invention are prepared by condensing a 3-bromo-4-n-alkoxybenzoyl chloride having the general formula:

(II)

and a 2-chloro-4-n-alkylphenol having the general formula:
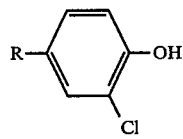
(III)
to prepare a (2'-chloro-4'-n-alkylphenyl)-3-bromo-4-n-alkoxybenzoate having the general formula:
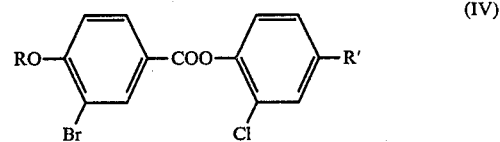
(IV)
wherein R and R' are straight-chain alkyl groups having from one to eight carbon atoms, and reacting the benzoate (IV) with cuprous cyanide to yield the desired ester (I).
21 Claims, 7 Drawing Figures

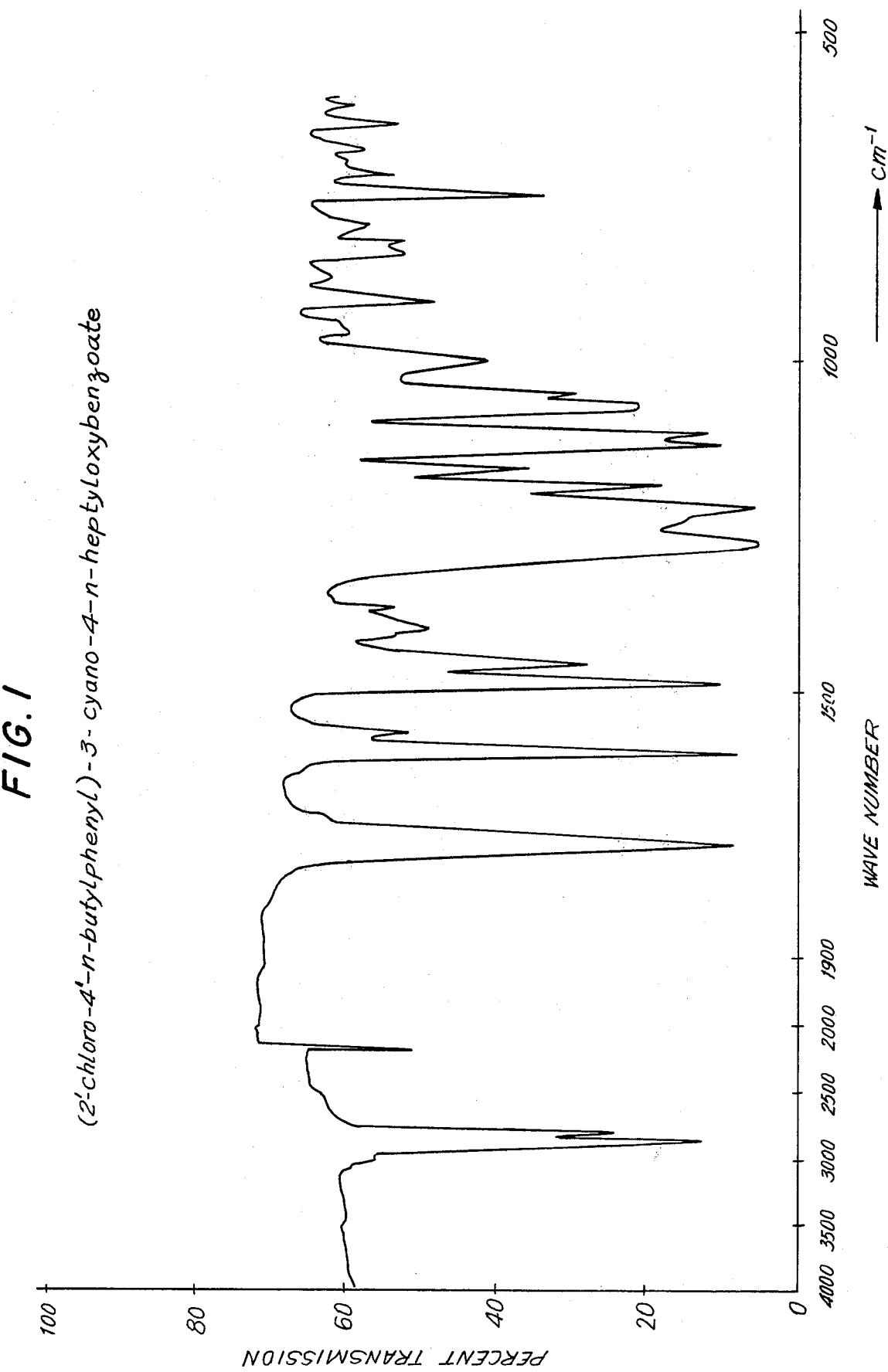

(2'-chloro-4'-n-butylphenyl)-3-cyano-4-n-hexyloxybenzoate

FIG.4
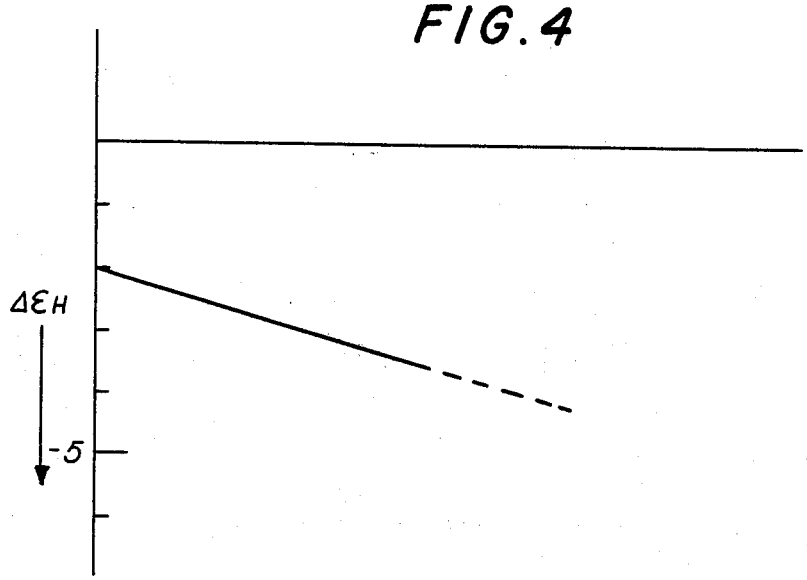
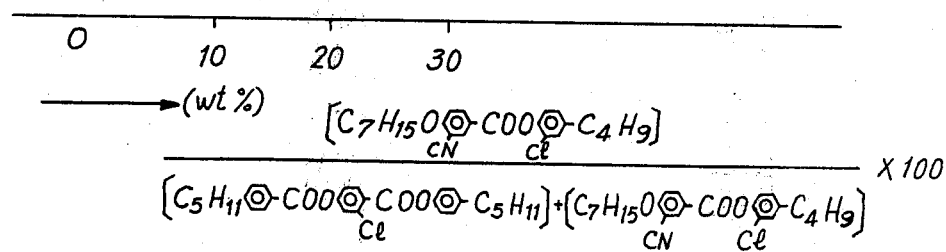
FIG.5
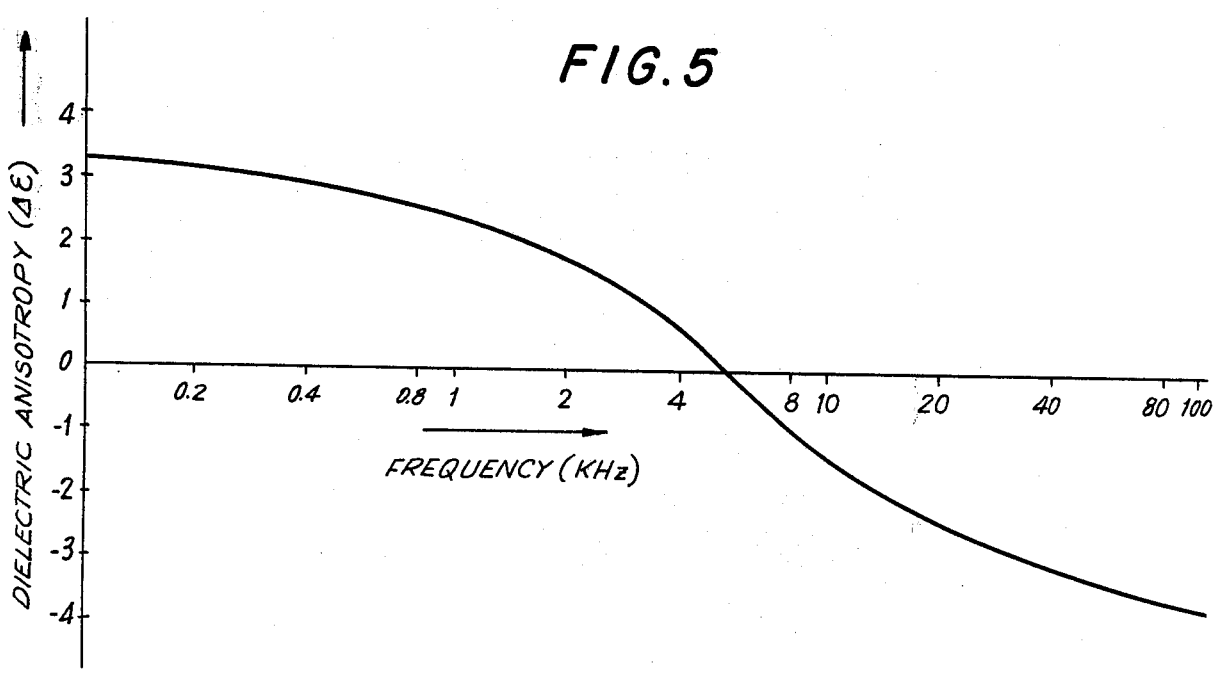

ESTER COMPOUNDS, LIQUID CRYSTAL COMPOSITION INCLUDING SAME AND METHOD OF PRODUCTION

BACKGROUND OF THE INVENTION

This invention relates generally to new ester compounds, liquid crystal compositions containing the ester compound and methods of preparing the new ester compounds, and more particularly to (2'-chloro-4'-alkylphenyl)-3-cyano-4-n-alkoxybenzoates.

Electro-optical display elements including liquid crystal compositions have been put into a variety of practical uses, in particular calculators, timepieces, and the like. These liquid crystal display elements may be driven by various driving methods. A multiplexing drive is generally used to drive the liquid crystal displays, such as the generalized AC amplitudes selective multiplexing method. However, such a method restricts the maximum number of rows which may be driven between eight and ten as a practical matter. Thus, there is difficulty in using the generalized AC amplitude selective multiplexing method to drive a televisional character display which are operated by addressing the multiplex matrix.

Recently, the two-frequency matrix-addressing method has been found to take advantage of the dielectric dispersion in the liquid crystal material and is somewhat effective in overcoming this disadvantage. However, when the multiplex matrix is addressed, by using the two-frequency matrix-addressing method, the energy consumption is high due to the fact that AC applied voltage is of high frequency and of high voltage. Thus, the two-frequency matrix-addressing method is less than completely satisfactory. It has been found that this energy consumption may be effectively reduced by making the driving voltage lower. It is known that the driving voltage V is dependent upon the dielectric anisotropy $\Delta\epsilon$ of the liquid crystal material used. This relationship has been defined as $$V\alpha\sqrt{\frac{K}{\Delta\epsilon}}$$

In other words, as the absolute value $$\left|\frac{\Delta\epsilon}{K}\right|$$

increases, the value of driving voltage V is reduced.

In the liquid crystal materials exhibiting a dielectric dispersion, the dielectric anisotropy $\Delta\epsilon$ is positive at relatively low frequencies and is reversed in the high frequency range. This characteristic is exhibited in FIGS. 4–6. The frequency which is 0 is denoted the critical frequency $f_c$ and is a physical characteristic of a liquid crystam material. The particular feature of the two-frequency driving method is that two AC power sources are utilized. A first lower frequency lower than $f_c$ and a second higher frequency, higher than $f_c$ are applied as a driving power source. This takes advantage of the difference in behavior of the liquid crystal material in both the low and high frequency ranges.

Generally speaking, when driving a display device by the multiplex driving method, the ratio of the signal voltage applied in a lighted condition to the signal applied in the non-lighted condition requires a value larger than a certain value, the larger the better. In the case of the generalized AC amplitude selective multiplexing method, the voltage ratio depends only on the number of rows in the device and there is little room for improvement of the display. In contrast, in the two-frequency matrix-addressing method, the ratio depends on the driving voltage and the dielectric constant of the liquid crystal material. It logically follows that any number of rows can be driven by this method.

Liquid crystal materials utilized in liquid crystal display devices driven by these two-frequency matrix-addressing method require the following properties. First, as noted above, in order to reduce the driving voltage, the absolute value of the dielectric anisotropy in both the low and high frequency ranges should be increased. Specifically, the absolute value of the dielectric anisotropy in the high frequency range should be increased. Second, the critical frequency and viscosity of the liquid crystal should be low. Conventional liquid crystal materials do not satisfy these requirements fully.

Accordingly, it is desirable to provide a liquid crystal composition having the desired characteristics. Such a liquid crystal composition would have an increased absolute value of the negative dielectric anisotropy at frequencies higher in the high frequency range.

SUMMARY OF THE INVENTION

Generally speaking, in accordance with the invention, ester compounds suitable for use in a liquid crystal composition, liquid crystal compositions including at least one ester compound and a method of preparing the ester compounds are provided. The new ester compound is a (2'-chloro-4'-n-alkylphenyl)-3-cyano--4-n-alkoxybenzoate which may be represented by the following general formula:

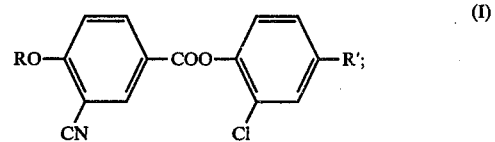

wherein R and R' are straight-chain alkyl groups having from one to eight carbon atoms. R and R' may be the same or different alkyl groups and in a preferred embodiment of the invention R is n-heptyl and R' is n-butyl or (2'-chloro-4'-n-butylphenyl)-3-cyano-4-n-heptyloxybenzoate.

These ester compounds in accordance with the invention do not possess a liquid crystal phase. However, addition of a relatively small amount of at least one of the ester compounds in accordance with the invention to a liquid crystal composition, yields a liquid crystal composition having an increased negative dielectric anisotropy in the high frequency range and especially at frequencies higher than the critical frequency when mixed with a liquid crystal composition exhibiting an inversion in dielectric anisotropy. Generally, between about at least an effective amount and 40 weight percent of at least one ester compound in accordance with the invention is added to the composition.

The ester compounds in accordance with the invention are prepared by condensing a 3-bromo-4-n-alkoxybenzoyl chloride having the general formula:

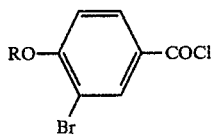

and a 2-chloro-4-n-alkylphenol having the general formula:

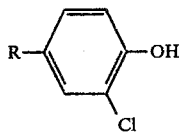

to yield a (2'-chloro-4'-alkylphenyl)-3-bromo-4-alkoxybenzoate having the general formula:

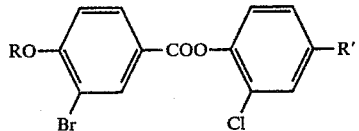

wherein R and R' are straight-chain alkyl groups having from one to eight carbon atoms and reacting compound (IV) with cuprous cyanide to yield the ester (2'-chloro-4'-n-alkylphenyl)-3-cyano-4-n-alkoxybenzoate.

Accordingly, it is an object of the invention to provide new ester compounds (2'-chloro-4'-alkylphenyl)-3-cyano-alkoxybenzoate ester compounds.

Another object of the invention is to provide improved liquid crystal compositions including the esters in accordance with the invention.

A further object of the invention is to provide a method of preparing the new esters.

Still other objects and advantages of the invention will in part be obvious and will in part be apparent from the specification.

The invention accordingly comprises the several steps and the relation of one or more of such steps with respect to each of the others, and the composition possessing the features properties, and the relation of constituents, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a graphical representation of the infrared absorption spectrum of (2'-chloro-4'-n-butylphenyl)-3-cyano-4-n-heptyloxybenzoate;

FIG. 4 is a graphical representation of the relationship between dielectric anisotropy when (2'-chloro-4'-n-butylphenyl)-3-cyano-4-n-heptyloxybenzoate is added to p-n-pentylphenyl-2-chloro-4-(p-n-pentylbenzoyloxy) benzoate in varying weight percentages at a frequency of 100 Hz;

FIG. 5 is a graphical illustration of the relationship between dielectric anisotropy and frequency for the liquid crystal composition of 70 weight percent p-n-pentylphenyl-2-chloro-4-(p-n-pentylbenzoyloxy)benzoate and 30 weight percent (2'-chloro-4'-n-pentylphenyl)-3-cyano-4-n-hexyloxybenzoate in accordance with the invention;

DESCRIPTION OF THE PREFERRED EMBODIMENTS

Figure 2:
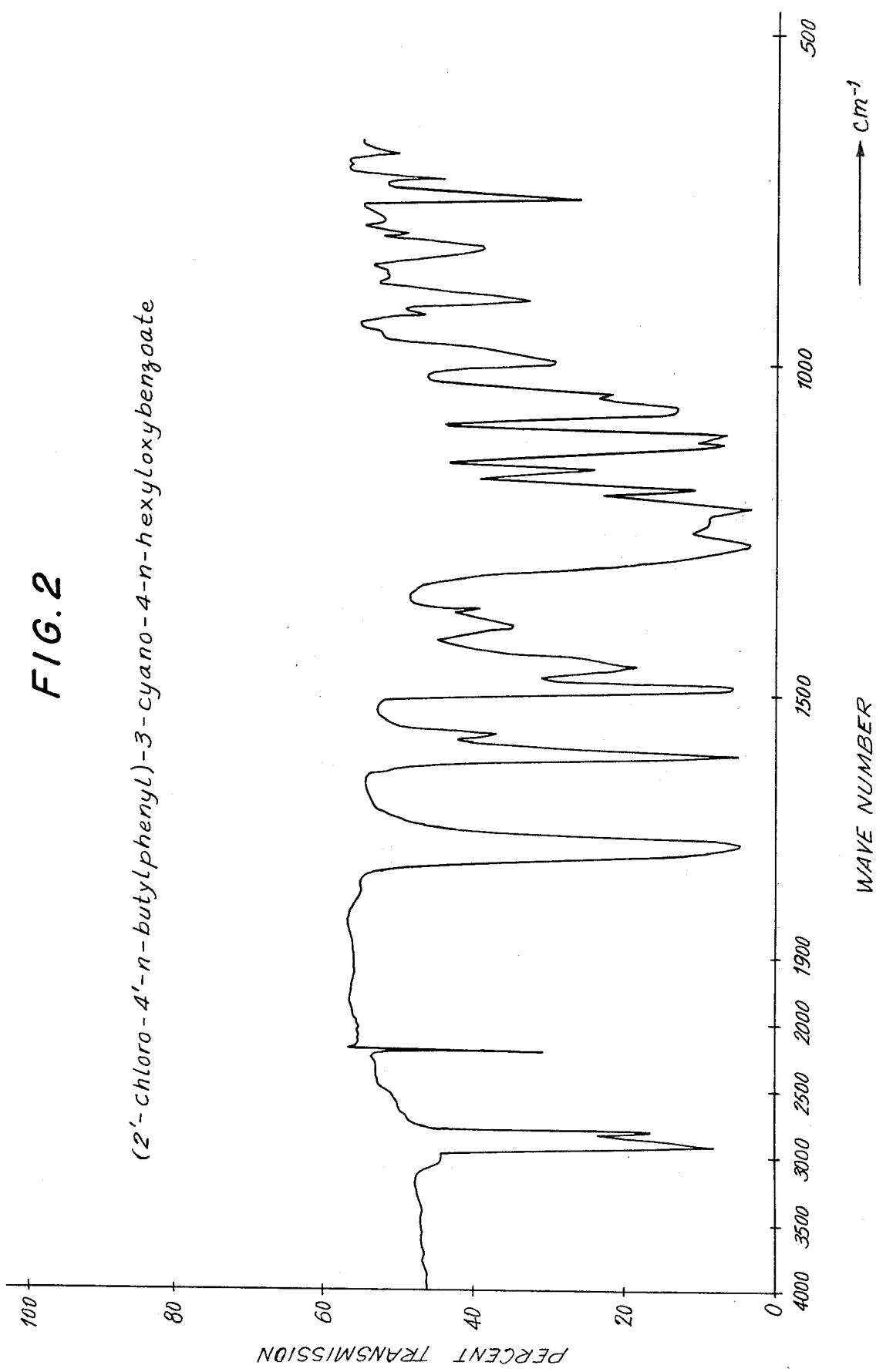
FIG. 2 is a graphical representation of the infrared absorption spectrum of (2'-chloro-4'-n-butylphenyl)-3-cyano-4-n-hexyloxybenzoate.

The new ester compounds in accordance with the invention are (2'-chloro-4'-n-alkylphenyl)-3-cyano-4-n-alkoxybenzoate represented by the general formula:

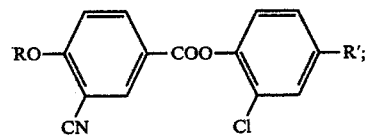

wherein R and R' are straight-chain alkyl groups selected from the group consisting of straight-chain alkyl groups having between one and eight carbon atoms, inclusive.

These ester compounds (I) are prepared by using as starting materials a p-hydroxybenzoic acid represented by the formula:

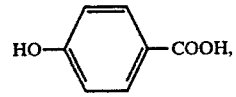

and a 2-chloro-4-alkylphenol represented by the formula:

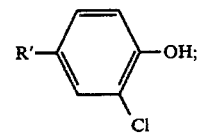

wherein R' is a straight-chain alkyl group having from one to eight carbon atoms.

The reaction steps may be represented by the following reaction sequence:

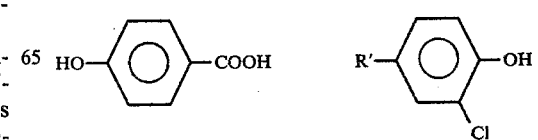

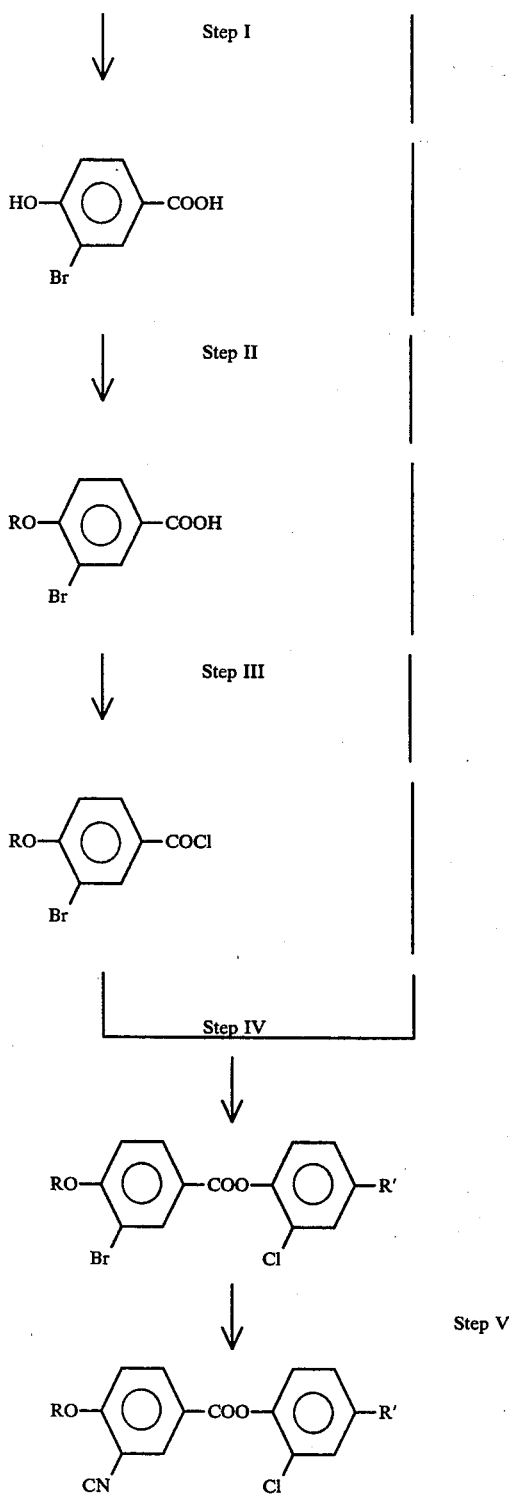

In each of the above formulas, R and R' are straight-chain alkyl groups selected from the group consisting of straight-chain alkyl groups having from one to eight carbon atoms, inclusive. The steps in the reaction sequence are as follows:

Step I: 3-bromo-4-hydroxybenzoic acid is prepared by reacting p-hydroxybenzoic acid and bromine in glacial acetic acid.

Step II: 3-bromo-4-alkoxybenzoic acid is prepared by reacting the 3-bromo-4-hydroxybenzoic acid prepared in Step I and an alkyl bromide in ethanol with aqueous potassium hydroxide added as a catalyst.

Step III: 3-bromo-4-alkoxybenzoyl chloride is prepared by reacting the 3-bromo-4-alkoxybenzoic acid prepared in Step II and thionyl chloride.

Step IV: (2'chloro-4'-alkylphenyl)-3bromo-4-alkoxybenzoate is prepared by reacting the 3-bromo-4-alkoxybenzol chloride prepared in Step III and 2-chloro-4-alkylphenol available on the market;

Step V: The desired ester (2'chloro-4'-alkylphenyl)-3-cyano-4-alkoxybenzoate is prepared by reacting the (2'chloro-4'-alkylphenyl)-3-bromo-4-alkoxybenzoate prepared in Step IV and cuprous cyanide in N,N dimethylformamide.

Preparation of the new ester compounds in accordance with the invention will be described in the following examples. In each case percentages set forth are by weight, based on the total weight of the mixture. The examples are set forth as illustrative, and not in a limiting sense. As noted above, R and R' each is an n-alkyl group of from one to eight carbon atoms. In the preferred species, the alkyl groups have from three to seven carbon atoms.

EXAMPLE 1

The ester (2'-chloro-4'-n-butylphenyl)-3-cyano-4-n-heptyloxybenzoate as represented by the general formula (I) wherein R is an n-heptyl group and R' is an n-butyl group was prepared as follows:

Step I 50 g (0.37 mol) of commercially available p-hydroxybenzoic acid was dissolved in 370 ml glacial acetic acid by heating with stirring. Heating was continued after the acid dissolved and 59 g (0.37 mol) bromine dissolved in 60 ml glacial acetic acid was rapidly added to the boiling solution to avoid bumping. The solution was refluxed for six hours with continuous stirring. Following reflux, the reaction solution was permitted to stand and cooled to room temperature. The cooled solution was poured into two liters of cold water. A white precipitate was formed. The white crystals were filtered by suction and were recrystalized with glacial acetic acid to yield 55.2 g of purified 3-bromo-4-hydroxybenzoic acid. The calculated yield was 70.3%.

Step II 25.8 g (0.119 mol) of the 3-bromo-4-hydroxybenzoic acid prepared in Step I was dissolved in 615 ml ethanol and 42.6 g (0.238 mol) of heptyl bromide was added to the solution. Aqueous potassium hydroxide (13.5 g of potassium hydroxide in 62 ml of water) was added with heating and the above solution was refluxed for ten hours. 125 ml of 10% aqueous potassium hydroxide was added and the solution was refluxed for two more hours. The reaction solution was allowed to stand to cool to room temperature, and excess 5 N hydrochloric acid solution was added commencing crystallization. The crystals were fractionated through filtration by suction, washed with water, dried and recrystallized with ethanol to yield 32.2 of purified 3-bromo-4-n-heptyloxybenzoic acid. The yield was calculated to be 85.9%.

Step III 11 g of thionyl chloride was added to 14.5 g (0.046 mol) of the 3-bromo-4-n-heptyloxybenzoic acid prepared in Step II and was gently refluxed for two hours. Excess thionyl chloride was removed by distillation or vacuum distillation to yield 14.2 of 3-bromo-4-n-heptyloxybenzoyl chloride. The yield was calculated to be 92.3%.

Step IV 3.9 g (0.021 m 91) of commercially available 2-chloro-4-n-butylphenol and 6 ml pyridine as a catalyst. A solution of 7.0 g (0.021 mol) of the 3-bromo-4-n-heptyloxybenzoyl chloride solution prepared in Step III in 30 ml of ethyl ester was slowly added to the reaction solution in a water bath to maintain the temperature at 0° C. After completion of the addition, the reaction solution was allowed to stand at room temperature for a while and was refluxed for two hours. After completion of the reaction, the reaction mixture was cleaned with acid, alkali and water. The water mixed in the organic layer was dehydrated with an hydrous sodium sulfate, and the ethyl ester was distilled off. The residue was recrystallized in hexane to yield 8.9 g of (2'-chloro-4'-n-butylphenyl)-3-bromo-4-n-heptyloxybenzoate. The calculated yield was 88.1%.

Step V 5 g (0.0104 mol) of the (2'-chloro-4'-n-butylphenyl)-3-bromo-4-n-heptyloxybenzoate prepared in Step IV and 1.86 g of cuprous cyanide were added to 28 ml of N,N-dimethylformamide. The suspension was gently refluxed for four and on-half hours. The reaction mixture was cooled to room temperature, poured into a solution of 8.3 g ferric chloride hexahydrate dissolved in a mixed solution of 2.1 ml of concentrated hydrochloric acid and 13 ml of water, and was stirred with heating at 65° C. for 30 minutes in order to decompose any complexes. An organic layer was extracted from the suspension with toluene, was cleaned and dehydrated. The toluene was distilled off. The residue was recrystallized in ethanol to yield 2.7 g of purified ester (2'-chloro-4'-n-butylphenyl)-3-cyano-4-n-heptyloxybenzoate. The yield was calculated to be 61.2%.

EXAMPLE 2

The procedure followed in Example 1 was repeated to prepare (2'-chloro-4'-n-butylphenyl)-3-cyano-4-n-hexyloxybenzoate. In this case in general formula (I) on the reaction mechanism R is a n-hexyl group and R' is a n-butyl group. The yields of intermediary compounds were approximately the same as obtained in Example 1.

EXAMPLE 3

The procedure followed in Example 1 was repeated to prepare (2'-chloro-4'-n-butylphenyl)-3-cyano-4-n-pentyloxybenzoate. In this case in general formula (I) in the reaction mechanism R is a n-pentyl group and R' is a n-butyl group. The yields of intermediary compounds were approximately the same as obtained in Example 1.

EXAMPLE 4

The procedure followed in Example 1 was repeated to prepare (2'-chloro-4'-n-propylphenyl)-3-cyano-4-n-hexyloxybenzoate. In this case in general Formula (I) in the reaction mechanism R is a n-propyl group and R' is a n-hexyl group. The yields of intermediary compounds were approximately the same as obtained in Example 1.

The following TABLE I sets forth the melting point and identifies the infrared absorption of the esters prepared in accordance with Examples 1-3.

TABLE I

| Example | Compound | Melting Point (°C.) | Infrared Absorption Spectrum - FIG. |
|---|---|---|---|
| 1 | $n\text{-}C_7H_{15}O\text{-}\bigcirc(CN)\text{-}COO\text{-}\bigcirc(Cl)\text{-}C_4H_9\text{-}n$ | 34.5 | 1 |
| 2 | $n\text{-}C_6H_{13}O\text{-}\bigcirc(CN)\text{-}COO\text{-}\bigcirc(Cl)\text{-}C_4H_9\text{-}n$ | 51.3 | 2 |
| 3 | $n\text{-}C_5H_{11}O\text{-}\bigcirc(CN)\text{-}COO\text{-}\bigcirc(Cl)\text{-}C_4H_9\text{-}n$ | 33.0 | 3 |
| 4 | $n\text{-}C_4H_9O\text{-}\bigcirc(CN)\text{-}COO\text{-}\bigcirc(Cl)\text{-}C_5H_{11}\text{-}n$ | 49.0 | (not shown) |

Figure 3:
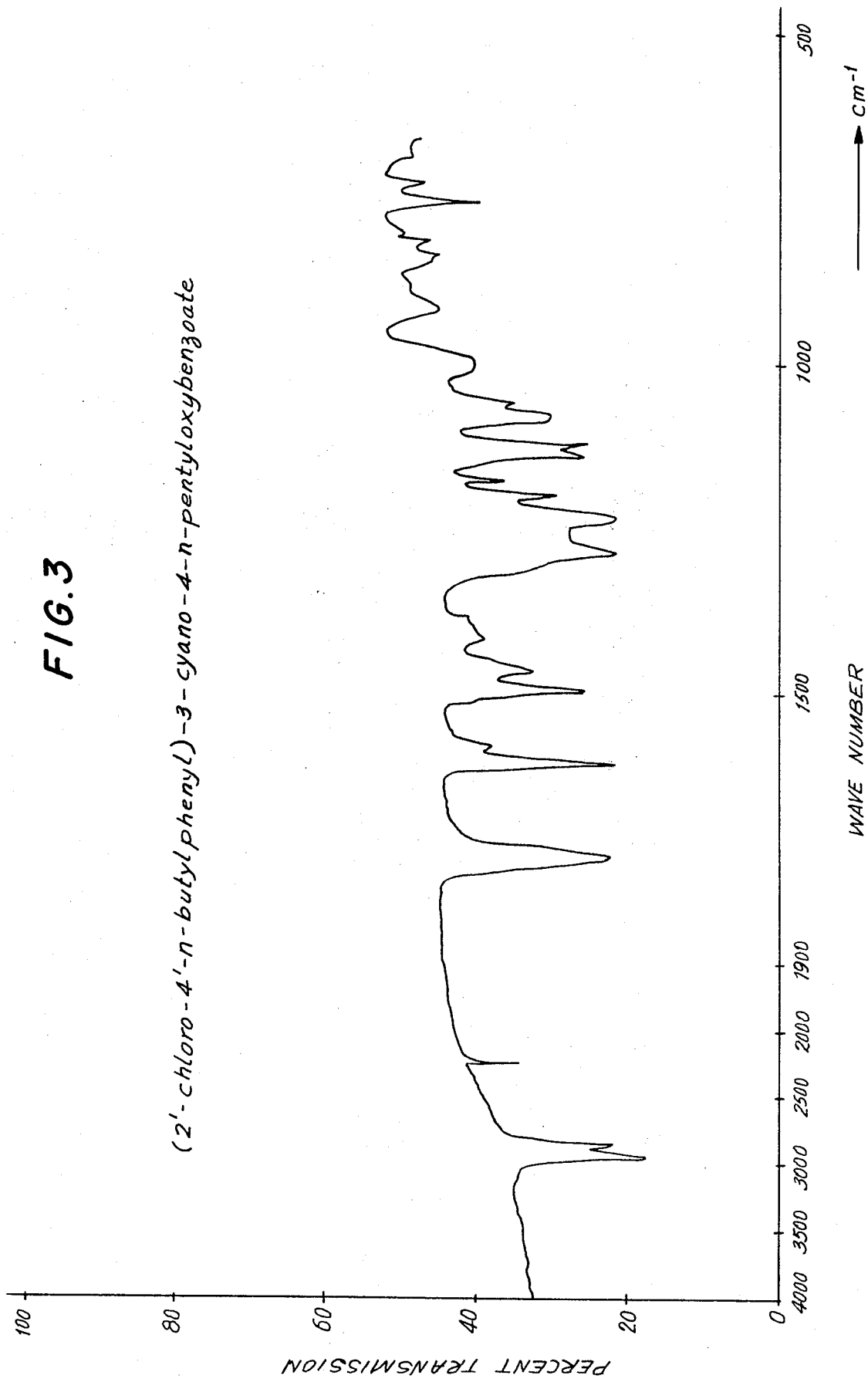
FIG. 3 is a graphical representation of the infrared absorption spectrum of (2'-chloro-4'-n-butylphenyl)-3-cyano-4-n-pentyloxybenzoate.

As noted in Table I, graphical representations of the infrared absorption spectrums of each of the ester compounds prepared in accordance with EXAMPLES 1-3 are shown in FIGS. 1-3, respectively.

As shown in Table I, the ester compounds themselves do not exhibit a liquid crystal phase. However, as the molecules are elongated, they may be mixed with liquid crystal materials. The ester compounds in accordance with the invention have a high absolute value of dielectric anisotropy and when added to a liquid crystal material even in a minor amount, the ester compound increases the absolute value of the negative dielectric anisotropy to the liquid crystal composition in the high frequency range. Thus, addition of an ester compound in accordance with the invention to a liquid crystal composition in an electrooptical display element driven by the two-frequency matrix-addressing method reduces the driving voltage, thereby decreasing the energy consumption of the device.

When preparing liquid crystal compositions containing an ester (2'-chloro-4'-alkylphenyl)-3-cyano-4-n-alkoxybenzoate in accordance with the invention, between at least an effective amount and up to about 40 weight percent of at least one ester compound is included in the liquid crystal compositions. Preferably, from a minor amount up to about 20 weight percent is included. The ester compounds may be added to conventional liquid crystal materials, such as biphenyl, azoxy and Schiff bases. Preferably, the ester compound is admixed with liquid crystal materials exhibiting an inversion of dielectric anisotropy about a critical frequency in order to lower the value of the negative dielectric anisotropy of the liquid crystal composition in the high-frequency range. These liquid crystal compositions are used in the two-frequency matrix-addressing drive method.

Examples of the liquid crystal materials that can be mixed with the ester compounds prepared in accordance with the invention are set forth in the following Table II.

TABLE II

| Liquid crystal compound | Melting point (°C.) | Clearing point (°C.) |
|---|---|---|
| 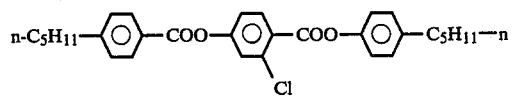 | 39.6 | 123.0 |
| 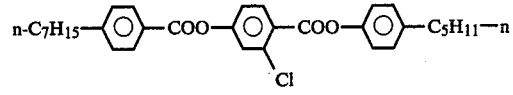 | 39.5 | 101.0 |
| 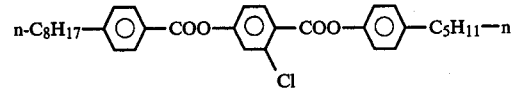 | 35.5 | 103.5 |
| 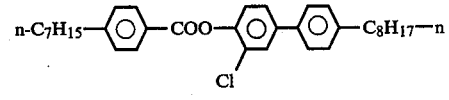 | 22 | 88 |
| 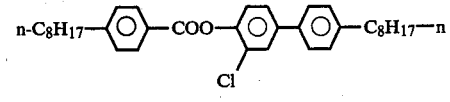 | 36 | 86 |
| 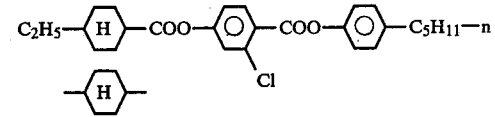 | 50.3 | 116.6 |
| 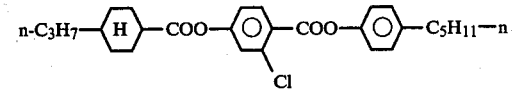 | 52.0 | 139.6 |
| 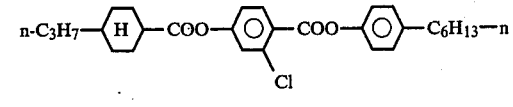 | 43.1 | 130.7 |
| 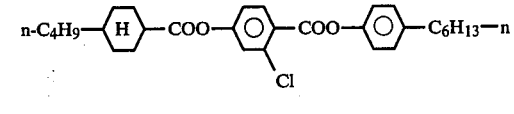 | 56.3 | 126.7 |
| 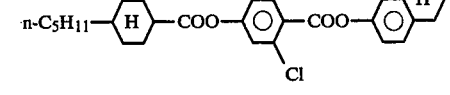 | 62.5 | 91 |
| 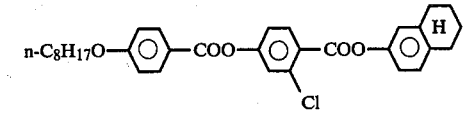 | 31.5 | 66.5 |

TABLE II-continued

| Liquid crystal compound | Melting point (°C.) | Clearing point (°C.) |
|---|---|---|
| n-C₇H₁₅–⟨O⟩–COO–⟨O⟩–COO–⟨O⟩–CH, Cl | 85.0 | 196.0 |
| n-C₆H₁₃–⟨O⟩–COO–⟨O⟩–COO–⟨O⟩–CH, Cl | 96.0 | 214.0 |
| n-C₇H₁₅–⟨O⟩–COO–⟨O⟩–COO–⟨O⟩–CH, Cl | 60.0 | 160.0 |
| n-C₇H₁₅–⟨O⟩–COO–⟨O⟩–OOC–⟨O⟩–C₇H₁₅–n, CN | 54.8 | 90.0 |
| n-C₄H₉–⟨H⟩–COO–⟨O⟩–OC₂H₅ | 35.5 | 74.0 |
| n-C₅H₁₁–⟨H⟩–COO–⟨O⟩–OC₅H₁₁–n | 34 | 72.0 |

In addition, various non-liquid crystal compounds of the type listed in Table III can be also mixed with liquid crystal compositions including compounds of the type listed in Tables I and II.

TABLE III

| Compound | Melting point (°C.) |
|---|---|
| n-C₇H₁₅–⟨O⟩–COO–⟨O⟩–C₅H₁₁–n, CN | 35.0 |
| n-C₃H₇–⟨H⟩–COO–⟨O⟩–C₅H₁₁–n, CN | 29.5 |
| n-C₅H₁₁–⟨H⟩–COO–⟨O⟩–C₅H₁₁–n, CN | 29.5 |
| n-C₅H₁₁O–⟨O⟩–COO–⟨O⟩–C₅H₁₁–n, CN CN | 66.5 |
| n-C₇H₁₅O–⟨O⟩–COO–⟨O⟩–C₄H₉–n, CN CN | 45.0 |

The liquid crystal composition obtained by mixing the compounds listed in Tables I, II and III in appropriate concentration yields compositions having a large absolute value of dielectric anisotropy Δε in the high frequency range, a relatively low critical frequency and a high response speed. The reason is that such a liquid crystal composition includes an ester compound in accordance with the invention represented by the general formula:

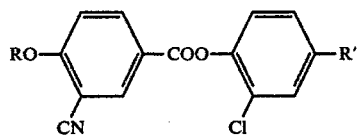

wherein R and R' are each a straight-chain alkyl group, and this compound, which is an ester compound having two benzene rings, has a cyano group and a chlorine each having large permanent dipole moment in the direction intersecting the major axis of the molecule.

EXAMPLE 4

Figure 6:
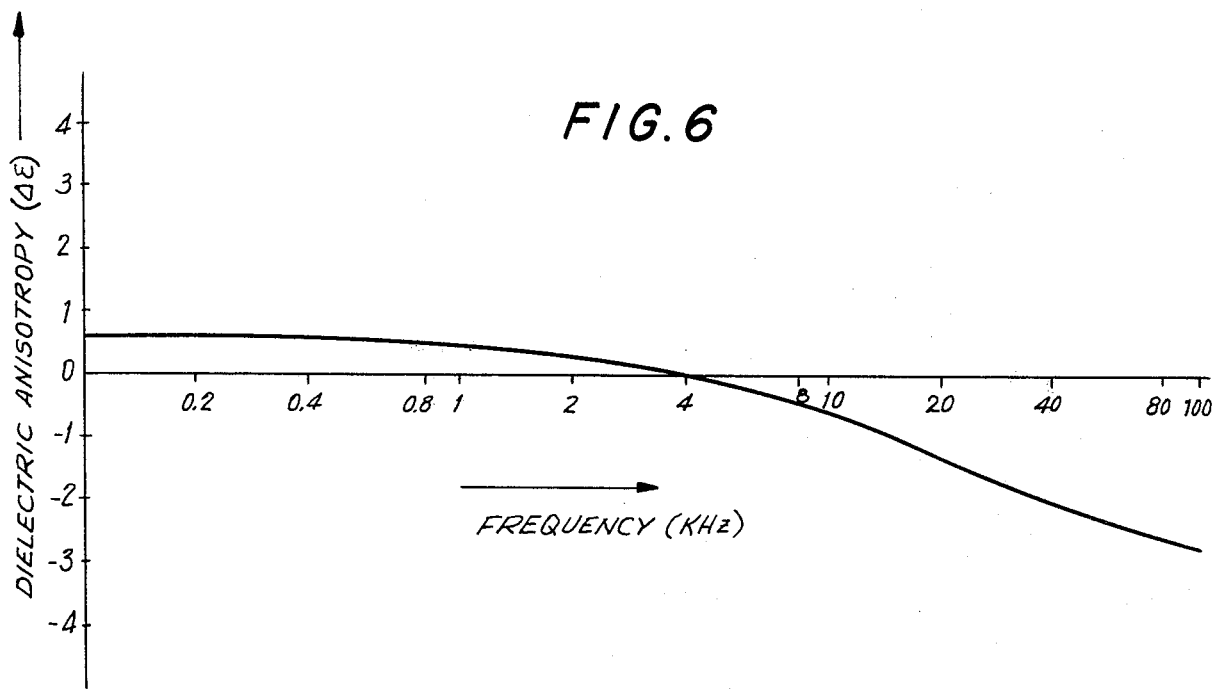
FIG. 6 is a graphical illustration of the relationship between dielectric anisotropy and frequency for the liquid crystal composition of Example 7.

A minor amount of the ester compound, (2'-chloro-4'-n-pentylphenyl)-3-cyano-4-n-pentyloxybenzoate in accordance with the invention was added to liquid crystal material, p-n-pentylphenyl-2-chloro-4-(p-n-pentylbenzoyloxy) benzoate [EASTMAN KODAK 11650] as the parent liquid crystal material. The dielectric anisotropy was measured in the low frequency range at 100 Hz. As shown in FIG. 6, when the amount of ester is increased, the absolute value of the dielectric anisotropy in the high-frequency range above the critical frequency is increased.

EXAMPLE 5

A liquid crystal composition was prepared from the compounds indicated in Table IV. The dependence of the dielectric anisotropy upon the frequency was measured at 30° C. and is shown in FIG. 5.

TABLE IV

| Compound | Weight Percentage | Clearing point (°C.) |
|---|---|---|
| n-C$_5$H$_{11}$O—⟨O⟩—COO—⟨O⟩(Cl)—COO—⟨O⟩—C$_5$H$_{11}$ | 70% | |
| n-C$_6$H$_{13}$O—⟨O⟩(CN)—COO—⟨O⟩(Cl)—C$_5$H$_{11}$—n | 30% | 66.0 |

From FIG. 5, it can be seen that a value of $|\Delta\epsilon|$ in the high frequency range is 3.9. As the value of $|\Delta\epsilon|$ before adding

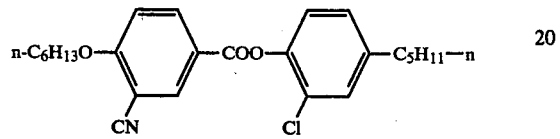

was 2.3 (Applied Physics Letters, Vol. 25, No. 4, Aug. 15, 1974), it is clear that addition of an ester compound in accordance with the invention increases the value of $|\Delta\epsilon|$ in the high frequency range.

EXAMPLE 6

The procedures of EXAMPLE 5 were repeated with 30 weight percent of (2'-cyano-4'-n-pentylphenyl)-3-chloro-4-n-hexyloxybenzoate

Figure 7:
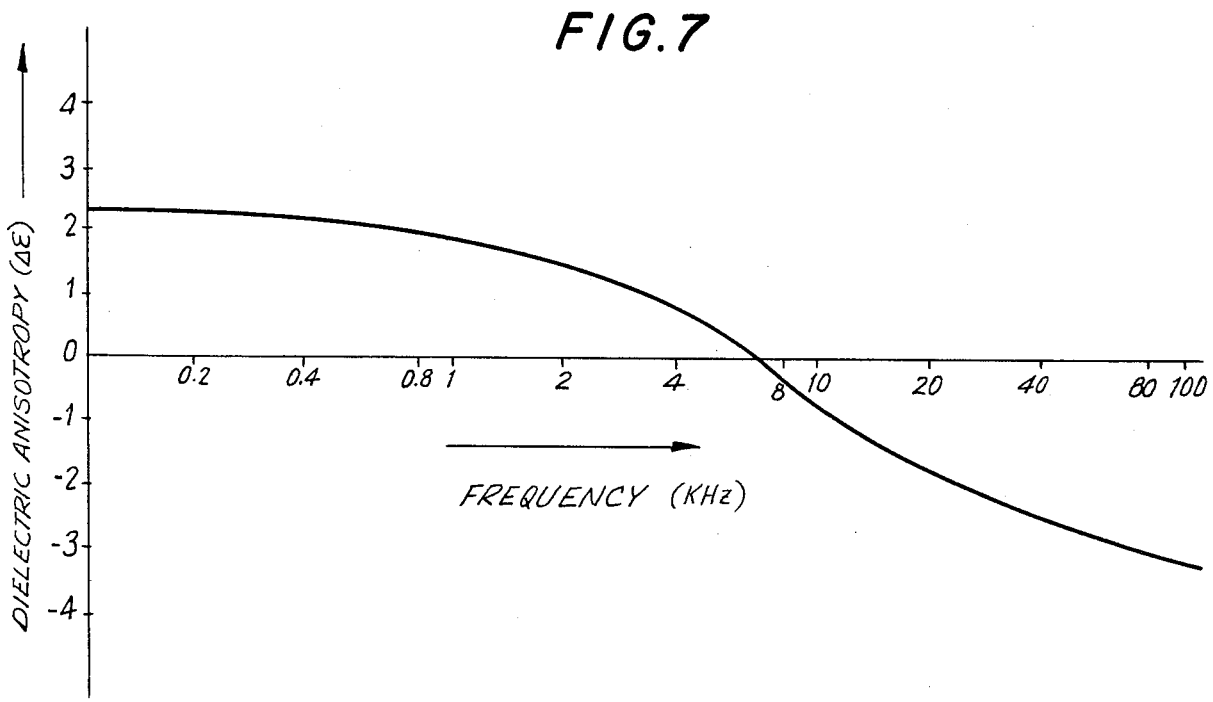
FIG. 7 is a graphical illustration of the relationship between dielectric anisotropy and frequency for the liquid crystal composition of Example 6 including (2'-cyano-4'-n-pentylphenyl)-3-chloro-4-n-hexyloxybenzoate.

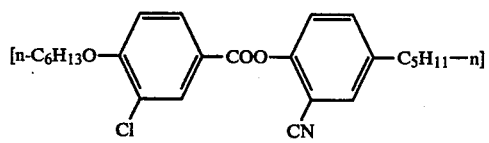

substituted for the ester of Example 5 and added to the liquid crystal composition. The value of was 3.2 and the relationship between dielectric anisotropy and frequency is shown in FIG. 7. Therefore, the addition of

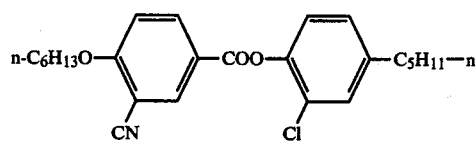

in accordance with the invention is more efficient.

EXAMPLE 7

A liquid crystal composition including the following materials was prepared in order to examine the dependence of dielectric anisotropy upon frequency. The liquid crystal composition included the following materials in the following weight percentages as set forth in Table V. The composition was placed in a liquid crystal display cell having the parameters and operated as indicated in Table VI. The results obtained were very desirable.

TABLE V

| Compound | Weight percentage | Clearing point (°C.) |
|---|---|---|
| n-C$_5$H$_{11}$—⟨O⟩—COO—⟨O⟩(Cl)—COOH—⟨O⟩—C$_5$H$_{11}$—n | 11.8% | |
| n-C$_8$H$_{17}$—⟨O⟩—COO—⟨O⟩(Cl)—COO—⟨O⟩—C$_5$H$_{11}$—n | 11.8% | |
| n-C$_5$H$_{11}$—⟨H⟩—COO—⟨O⟩(Cl)—COO—⟨O⟩—C$_5$H$_{11}$—n | 7.9% | |
| n-C$_6$H$_{13}$O—⟨O⟩—COO—⟨O⟩—COO—⟨O⟩(Cl)—CN | 5.5% | |
| n-C$_5$H$_{11}$—⟨O⟩—⟨O⟩—COO—⟨O⟩(CN)—C$_7$H$_{15}$—n | 7.9% | |
| | | 75° C. |

TABLE V-continued

| Compound | Weight percentage | Clearing point (°C.) |
|---|---|---|
| n-C₃H₇—⟨H⟩—COO—⟨O⟩—OC₂H₅ | 15.7% | |
| n-C₄H₉—⟨H⟩—COO—⟨O⟩—OC₂H₅ | 15.7% | |
| n-C₇H₁₅O—⟨O⟩(CN)—COO—⟨O⟩(Cl)—C₄H₉—n | 7.9% | |
| n-C₆H₁₃O—⟨O⟩(CN)—COO—⟨O⟩(Cl)—C₄H₉—n | 7.9% | |
| n-C₆H₁₃O—⟨O⟩—COO—⟨O⟩—OC₈H₁₇—n | 7.9% | |

TABLE VI

| | |
|---|---|
| Thickness of liquid crystal cell | 8 μm |
| Frame frequency | 50 Hz |
| Frequency of high frequency power source | 50 KHz |
| Frequency of low frequency power source | 67 Hz |
| Duty | 1/32 |

The graphical representation of the dielectric anisotropy versus frequency characteristics at 25.7° C. is set forth in FIG. 6. In this case, the driving voltage was ±30 V. The response time of the device was also very high. The sum of the rising time, falling time and delay time was 300 msec at 25° C. Although a convention FE-type liquid crystal composition provides higher speeds, these results are adequate for use.

Thus based on these results it can be seen that a liquid crystal compositions in accordance with this invention are best suited for liquid crystal display elements driven in the two-frequency matrix-addressing method. These liquid crystal display elements driven by the two-frequency matrix-addressing method utilized such liquid crystal compositions are convenient for displaying character displays.

It will thus be seen that the objects set forth above, among those made apparent from the preceding description, are efficiently attained, and since certain changes may be made in the products, in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. An ester compound represented by the general formula

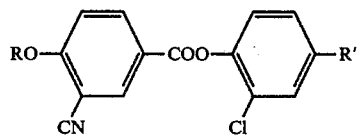

wherein R and R' are alkyl groups selected from the group consisting of straight-chain alkyl groups having from one to eight carbon atoms for defining a (2'-chloro-4'-n-alkylphenyl)-3-cyano-4-n-alkoxybenzoate.

2. The ester compound of claim 1, wherein R and R' are selected from the group consisting of straight-chain alkyl groups having from three to seven carbon atoms.

3. The ester compound of claim 1, wherein R is a straight-chain alkyl group having seven carbon atoms and R' is a straight-chain alkyl group having four carbon atoms for defining (2'-chloro-4'-n-butylphenyl)-3-cyano-4-n-heptyloxybenzoate.

4. The ester compound of claim 1, wherein R is a straight-chain alkyl group having six carbon atoms and R' is a straight-chain alkyl group having four carbon atoms defining (2'-chloro-4'-n-butylphenyl)-3-cyano-4-n-hexyloxybenzoate.

5. The ester compound of claim 1 wherein R is a straight-chain alkyl group having five carbon atoms and R' is a straight-chain alkyl group having four carbon atoms for defining (2'-chloro-4'-n-butylphenyl)-3-cyano-4-n-pentyloxybenzoate.

6. The ester compound of claim 1, wherein R is a straight-chain alkyl group having four carbon atoms and R' is a straight-chain alkyl group having five carbon atoms for defining (2'-chloro-4'-n-pentylphenyl-3-cyano-4-n-butyloxybenzoate.

7. A liquid crystal composition comprising liquid crystal material admixed with at least one (2'-chloro-4'-alkylphenyl)-3-cyano-4-alkyloxybenzoate represented by the general formula:

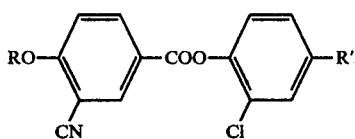

wherein R and R' are selected from the group consisting of straight-chain alkyl groups having from one to eight carbon atoms.

8. The liquid crystal composition of claim 7, wherein said liquid crystal material includes at least one frequency-dependent liquid crystal compound exhibiting a dielectric dispersion at low frequencies.

9. The liquid crystal composition of claim 8, wherein said liquid crystal material has a positive dielectric anisotropy in the low frequency range lower than the critical frequency and a negative dielectric anisotropy in the high frequency range above the critical frequency.

10. The liquid crystal composition of claim 9, wherein said benzoate compound is present in at least an amount effective to increase the absolute value of the dielectric anisotropy in the high frequency range.

11. The liquid crystal composition of claim 10, wherein said at least one benzoate is present between the effective amount to about 40 weight percent, based on the total weight of the composition.

12. The liquid crystal composition of claim 10, wherein, said at least one benzoate is present in from an effective amount to about 20 weight percent, based on the total weight of the composition.

13. The liquid crystal composition of claims 7 or 11, wherein said frequency-dependent liquid crystal material includes a nematic liquid crystal material having a linear chain of at least two aromatic groups, interconnected through a divalent linking group.

14. The liquid crystal composition of claim 13, wherein the divalent linking group is a carboxy group.

15. The liquid crystal composition of claim 7, wherein said frequency-dependent liquid crystal material includes a nematic liquid crystal material having a linear chain of at least one aromatic and at least one cyclohexane ring interconnected through a divalent linking group.

16. The liquid crystal composition of claim 7, wherein said liquid crystal material includes at least one liquid crystal compound selected from the group consisting of:

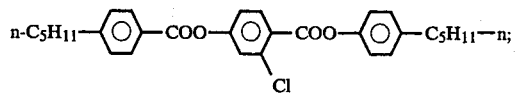

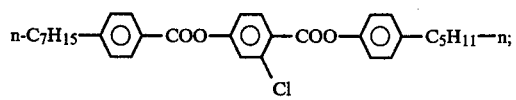

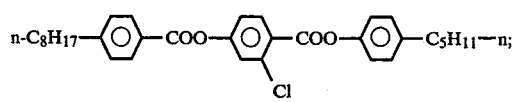

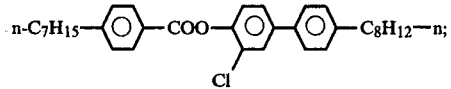

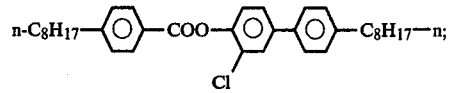

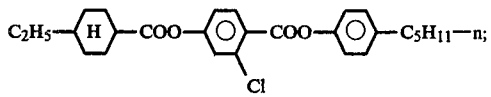

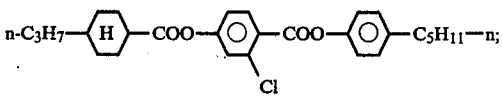

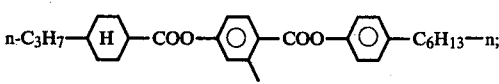

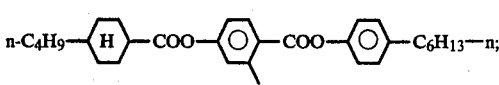

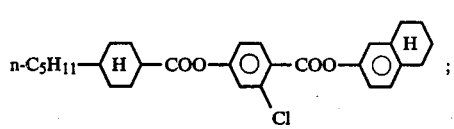

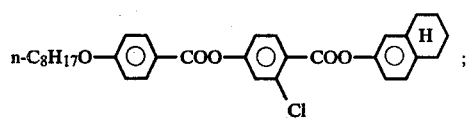

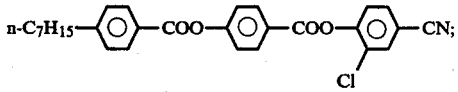

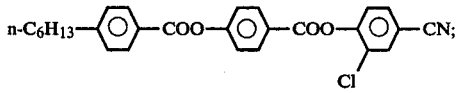

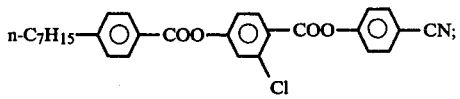

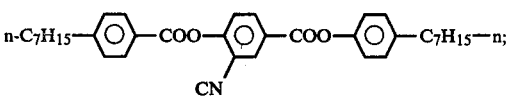

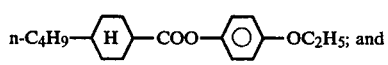

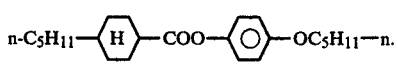

17. The liquid crystal composition of claim 7, wherein said liquid crystal material includes at least one liquid crystal compound selected from the group consisting of biphenyl, azoxy compounds and Schiff bases.

18. A liquid crystal composition comprising about 70 weight percent p-n-pentylphenyl-2-chloro-4-(p-n-pentylbenzoyloxy) benzoate and 30 weight percent (2'-chloro-4'-n-alkylphenyl)-3-cyano-4-n-alkoxybenzoate.

19. The liquid crystal composition of claim 18, wherein said (2'-chloro-4'-n-alkylphenyl)-3-cyano-4-n-alkoxybenzoate is (2'-chloro-4'-n-pentylphenyl)-3-cyano-4-n-hexyloxybenzoate.

20. A liquid crystal composition comprising:

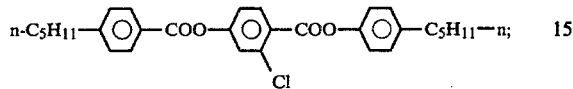

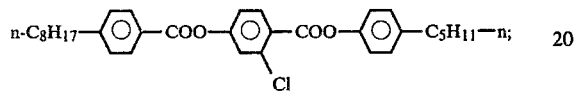

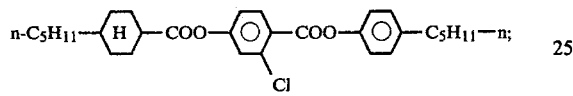

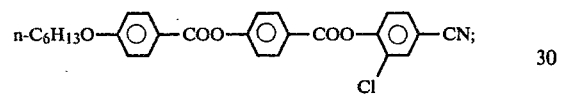

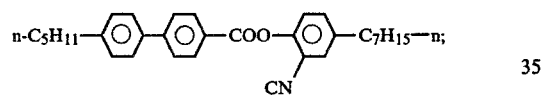

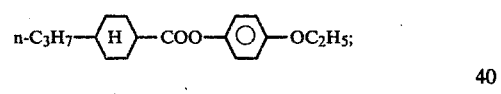

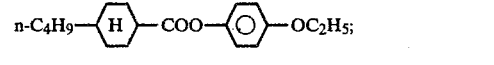

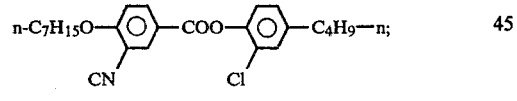

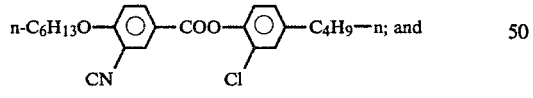

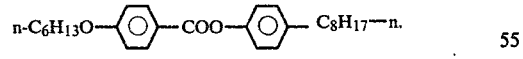

21. A liquid crystal composition comprising
(1) at least one (2'-chloro-4'-n-alkylphenyl)-3-cyano-4-n-alkoxybenzoate selected from the group consisting of

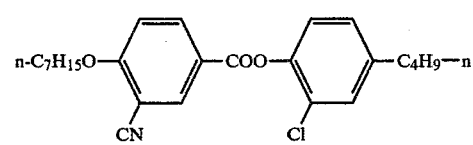

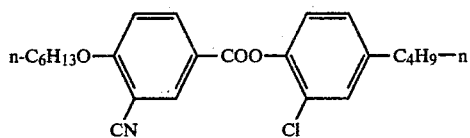

-continued

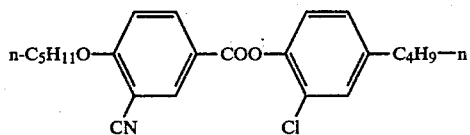

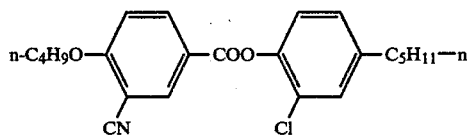

(2) at least one liquid crystal compound selected from the group consisting of:

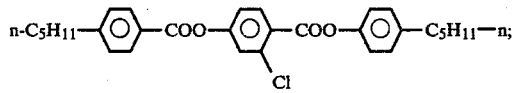

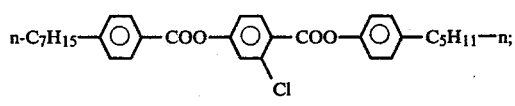

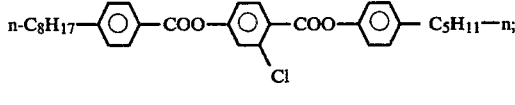

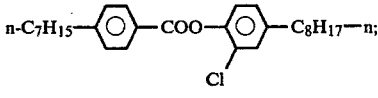

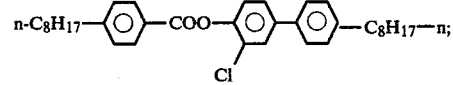

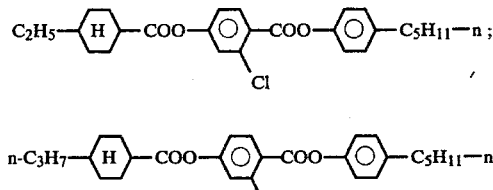

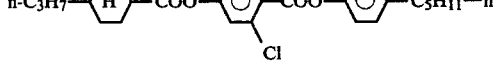

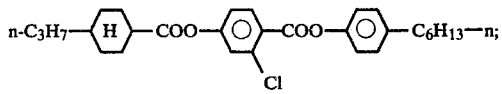

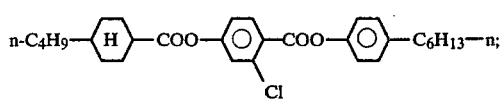

-continued
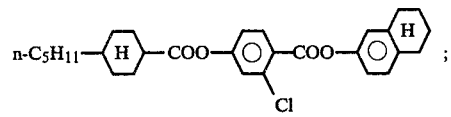
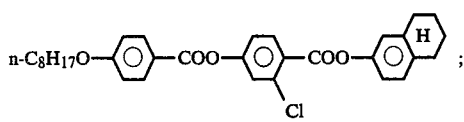
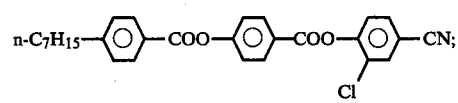
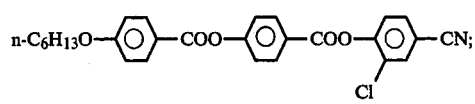
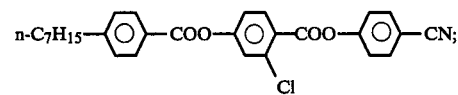
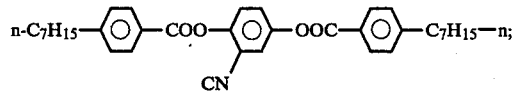
-continued
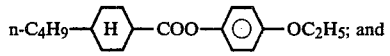
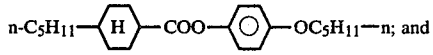
(3) at least one non-liquid crystal compound selected from the group consisting of:
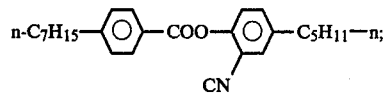
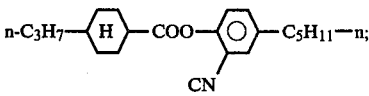
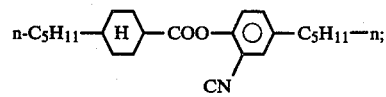
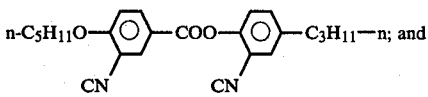
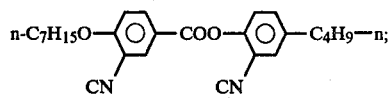
* * * * *